US00RE42768E

(19) United States
(12) Reissued Patent
Huang

(10) Patent Number: US RE42,768 E
(45) Date of Reissued Patent: Oct. 4, 2011

(54) ROBUST WRENCH

(75) Inventor: Hsiu-Ching Huang, Taipei (TW)

(73) Assignee: Infar Industrial Co., Ltd., Chang Hua Hsien (TW)

(21) Appl. No.: 11/798,061

(22) Filed: May 10, 2007

Related U.S. Patent Documents

Reissue of:
(64) Patent No.: 7,082,859
Issued: Aug. 1, 2006
Appl. No.: 10/454,196
Filed: Jun. 5, 2003

(30) Foreign Application Priority Data

May 29, 2003 (TW) ..... 92114490

(51) Int. Cl.
*B25B 13/46* (2006.01)

(52) U.S. Cl. ..... 81/62; 81/63.1

(58) Field of Classification Search ..... 81/62, 63.1, 81/58.4, 60; 192/43.2
See application file for complete search history.

(56) References Cited

U.S. PATENT DOCUMENTS 2,201,705 A * 5/1940 Stone ..... 192/43.2
2,201,827 A * 5/1940 Froeschl et al. ..... 192/43.2
4,561,329 A * 12/1985 Lack ..... 81/62
5,174,176 A * 12/1992 Krivec ..... 81/63.1
5,178,047 A * 1/1993 Arnold et al. ..... 81/63.2
6,382,051 B1 * 5/2002 Chang ..... 81/60
6,539,825 B1 * 4/2003 Lin ..... 81/60
6,691,594 B2 * 2/2004 Chen ..... 81/61
7,082,859 B2 * 8/2006 Huang ..... 81/62
2004/0055422 A1 * 3/2004 Lin ..... 81/60
2004/0237727 A1 * 12/2004 Huang ..... 81/62
2004/0261584 A1 * 12/2004 Huang ..... 81/63.1

* cited by examiner

*Primary Examiner* — Lee D Wilson
(74) *Attorney, Agent, or Firm* — Rosenberg, Klein & Lee

(57) ABSTRACT

A wrench includes a handle, a clutch, a detent, a controller, a gear and a C-ring. The handle includes an annular head defining a circular space, a pothole not overlapping the circular space, a channel for communicating the circular space with the pothole, a recess and an annular groove both defined in a wall of the circular space. The clutch includes two claws put in the recess and a spring put between the claws. Each of the claws includes a toothed face and a rod. The claws can easily be put into the recess since the rods can be moved through the channel. A controller is put rotationally in the pothole for moving the rods. The gear is put in the circular space. The gear includes a toothed face for engagement with the toothed face of one of the claws. The C-ring includes an external edge put in the annular groove, an internal edge for retaining the annular gear in the circular space and a gate projecting from an upper face for blocking the channel.

11 Claims, 5 Drawing Sheets

ROBUST WRENCH

Matter enclosed in heavy brackets [ ] appears in the original patent but forms no part of this reissue specification; matter printed in italics indicates the additions made by reissue.

This nonprovisional application claims priority under 35 U.S.C. 119(a) on Patent Application No(s). 92114490 filed in TAIWAN on May 29, 2003, which is(are) herein incorporated by reference.

FIELD OF INVENTION

The present invention relates to a robust wrench.

BACKGROUND OF INVENTION

Taiwanese Patent Publication No. 380471 discloses a conventional wrench including an annular head 20 and a grip 21 extending from the annular head 20. The annular head 20 defines a space 22, a recess 23 communicated with the space 22, a hole 24 communicated with the recess 23, a hole 25 co-centrically communicated with the hole 24 and a hole 26 eccentrically communicated with the hole 24. The space 22 partially overlaps the hole 24. A clutch is put in the recess 23. The clutch includes two claws 40 and a spring 43 between the claws 40. Each of the claws 40 includes a toothed face 41 and a rod 42. An annular gear 30 is put in the space 22. The annular gear 30 includes a toothed internal face 31 for engagement with a nut or a head of a bolt and a toothed external face 33 for engagement with the toothed face 41 of one of the claws 40. A positioning device 60 is put in the hole 26. The positioning device 60 includes a spring 61 and a ball detent 62. A disc 50 is put in the hole 24. The disc 50 includes a central hole 51 through which a bolt is driven into the hole 25. A recess 52 and two recesses 53 are defined in a lower face of the disc 50. The rods 42 are put in the recess 52. The recess 52 includes two opposite walls in contact with the rods 42. The ball detent 62 can be put in one of the recesses 53. A handle 54 is secured to the disc 50. However, the annular gear 30 is likely to escape the space 22 since it is retained only by means of a portion of the disc 50.

The present invention is therefore intended to obviate or at least alleviate the problem encountered in prior art.

SUMMARY OF INVENTION

The primary objective of the present invention is to provide a robust wrench.

According to the present invention, a wrench includes a handle, a clutch, a detent, a controller, a gear and a C-ring. The handle includes an annular head defining a circular space, a pothole not overlapping the circular space, a channel for communicating the circular space with the pothole, a recess and an annular groove both defined in a wall of the circular space. The clutch includes two claws put in the recess and a spring put between the claws. Each of the claws includes a toothed face and a rod. The claws can easily be put into the recess since the rods can be moved through the channel. A controller is put rotationally in the pothole for moving the rods. The gear is put in the circular space. The gear includes a toothed face for engagement with the toothed face of one of the claws. The C-ring includes an external edge put in the annular groove, an internal edge for retaining the annular gear in the circular space and a gate projecting from an upper face for blocking the channel.

Other objects, advantages and novel features of the invention will become more apparent from the following detailed description in conjunction with the attached drawings.

BRIEF DESCRIPTION OF DRAWINGS

The present invention will be described via detailed illustration of embodiments referring to the drawings.

DETAILED DESCRIPTION OF EMBODIMENTS

Figure 1:
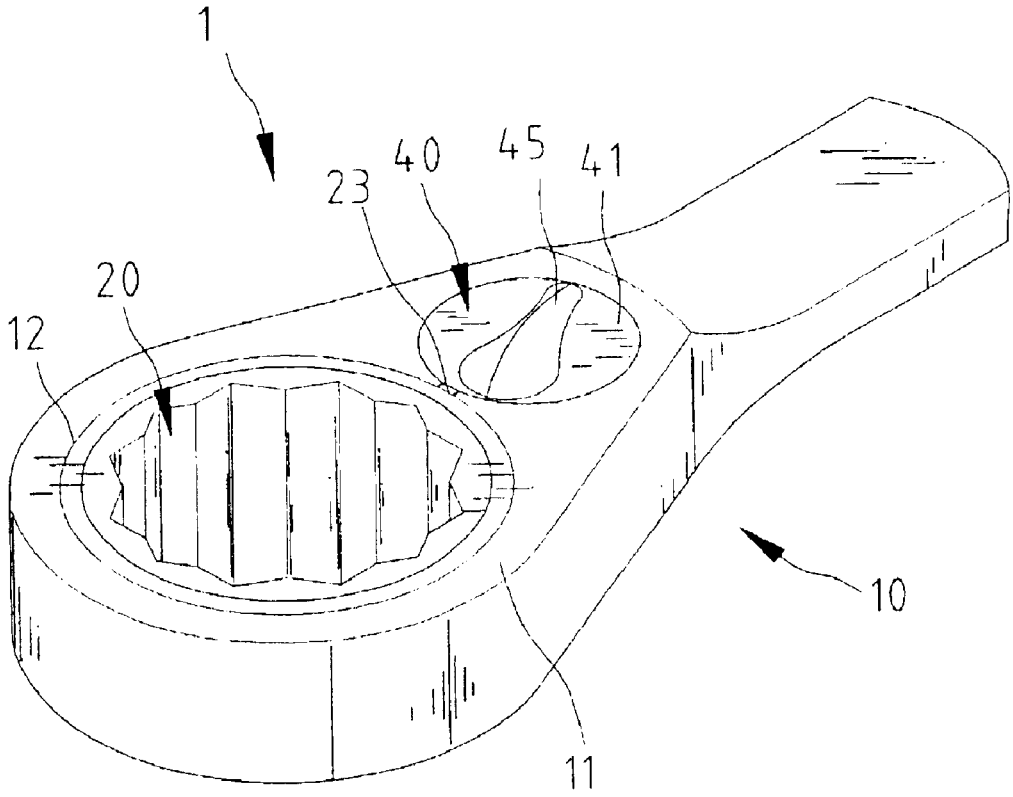
FIG. 1 is a perspective view of a wrench according to a first embodiment of the present invention.
Figure 2:
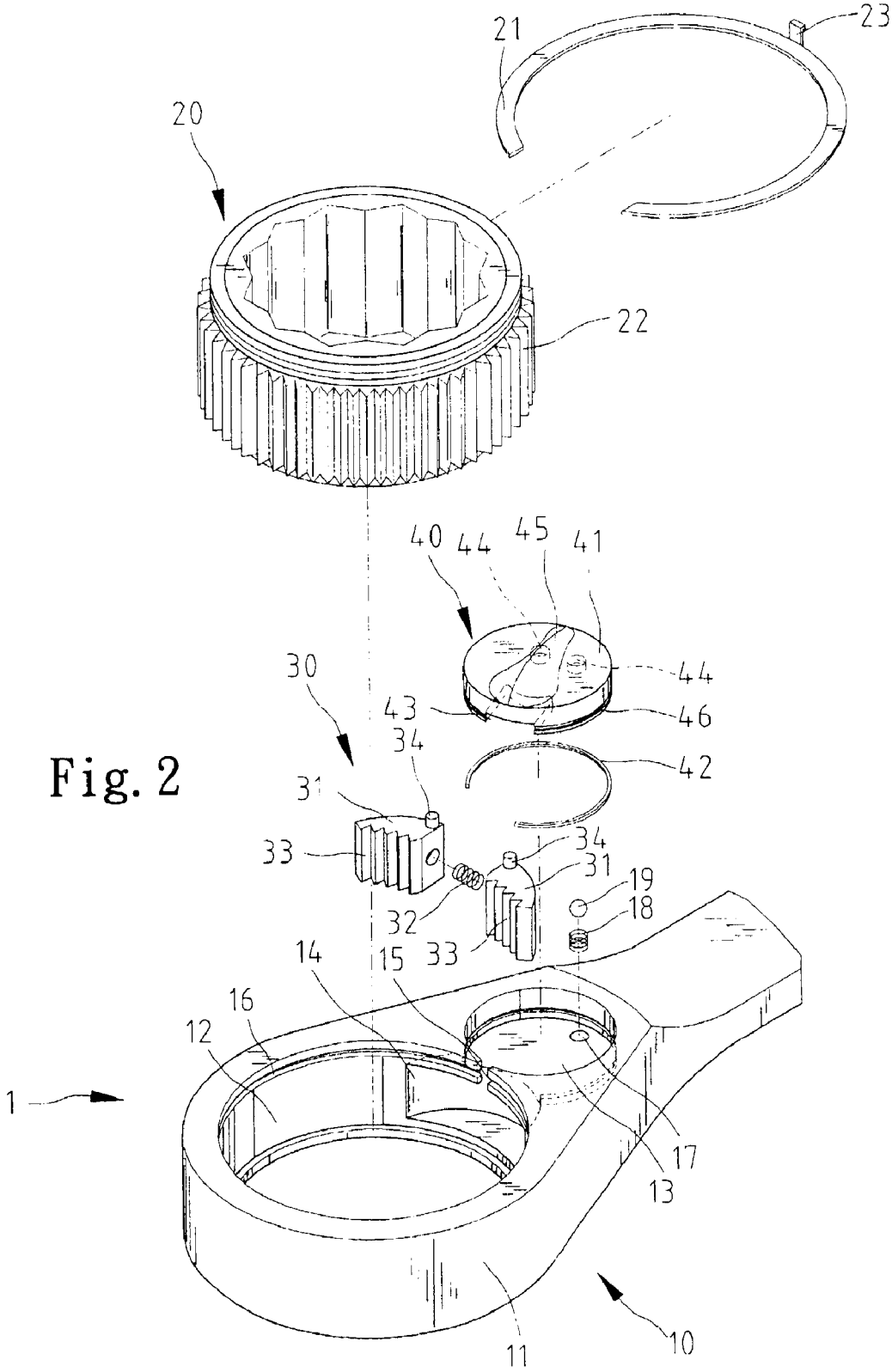
FIG. 2 is an exploded view of the wrench of FIG. 1.
Figure 3:
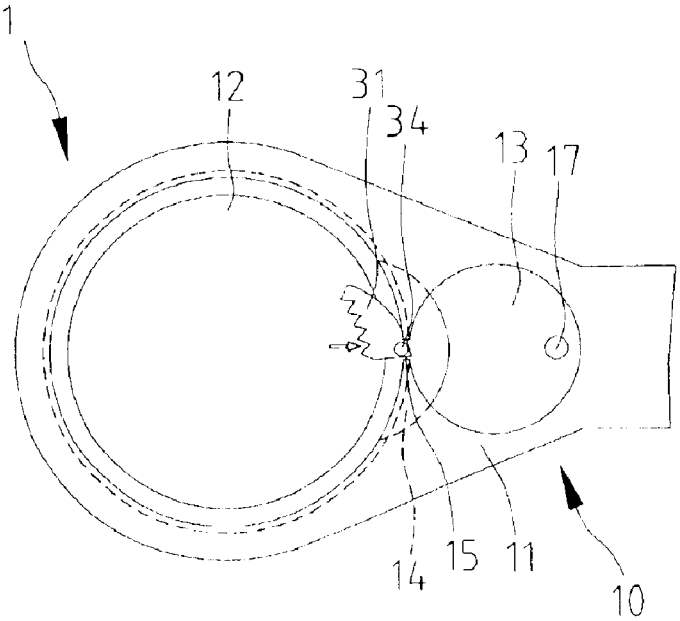
FIG. 3 is a top view of the wrench of FIG. 1.
Figure 4:
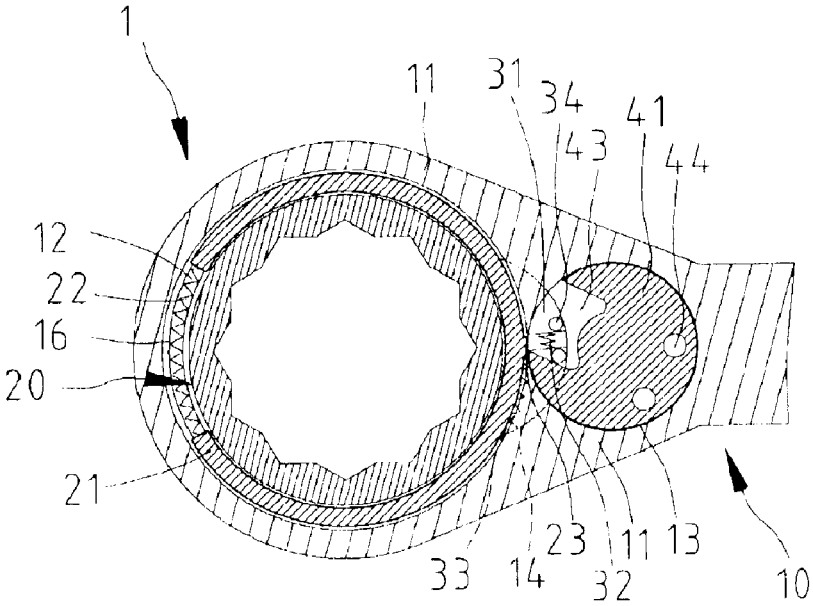
FIG. 4 is a cross-sectional view of the shown in FIG. 1.

Referring to FIGS. 1~4, a wrench 1 according to a first embodiment of the present invention includes a handle 10, an annular gear 20, a clutch 30 and a controller 40.

The handle 10 includes an annular head 11 and a grip (not numbered) extending from the annular head 11.

The annular head 11 defines a space 12 and a pothole 13. The space 12 is in the form of a large circle. The pothole 13 is in the form of a small circle not overlapping the large circle. The space 12 is communicated with the pothole 13 through a channel 15. A recess 14 and an annular groove 16 are defined in the wall of the space 12. The recess 14 is communicated with the pothole 13. A hole 17 is defined in the bottom of the pothole 13.

The clutch 30 is put in the recess 14. The clutch 30 includes two claws 31 and a spring 32 between the claws 31. Each of the claws 31 includes a toothed face 33 and a rod 34. The claws 31 can be put into the recess 14 since the rods 34 can be moved through the channel 15.

A positioning device including a spring 18 and a ball detent 19 is put in the hole 17.

The controller 40 is put in the pothole 13. The controller 40 includes a disc 41 and a C-ring 42. The disc 41 includes a recess 43 and two recesses 44 all defined in a lower face. The rods 34 are put in the recess 43. The recess 43 includes two opposite walls for contact with the rods 42. The ball detent 19 can be put in one of the recesses 44. A ridge 45 is formed on an upper face of the disc 41. The disc 41 defines an annular groove 46 so as to receive an internal edge of the C-ring 42. The wall of the pothole 13 defines an annular groove 47 so as to receive an external edge of the C-ring 42.

The annular gear 20 is put in the space 12. The annular gear 20 includes a toothed internal face (not numbered) for engagement with a nut or a head of a bolt and a toothed external face 22 for engagement with the toothed face 33 of one of the claws 31.

A C-ring 21 includes a gate 23 projecting from an upper face. The C-ring 21 includes an external edge put in the annular groove 16 and an internal edge for retaining the annular gear 20 in the space 12. The channel 15 is shut by means of the gate [21] *23*.

Figure 5:
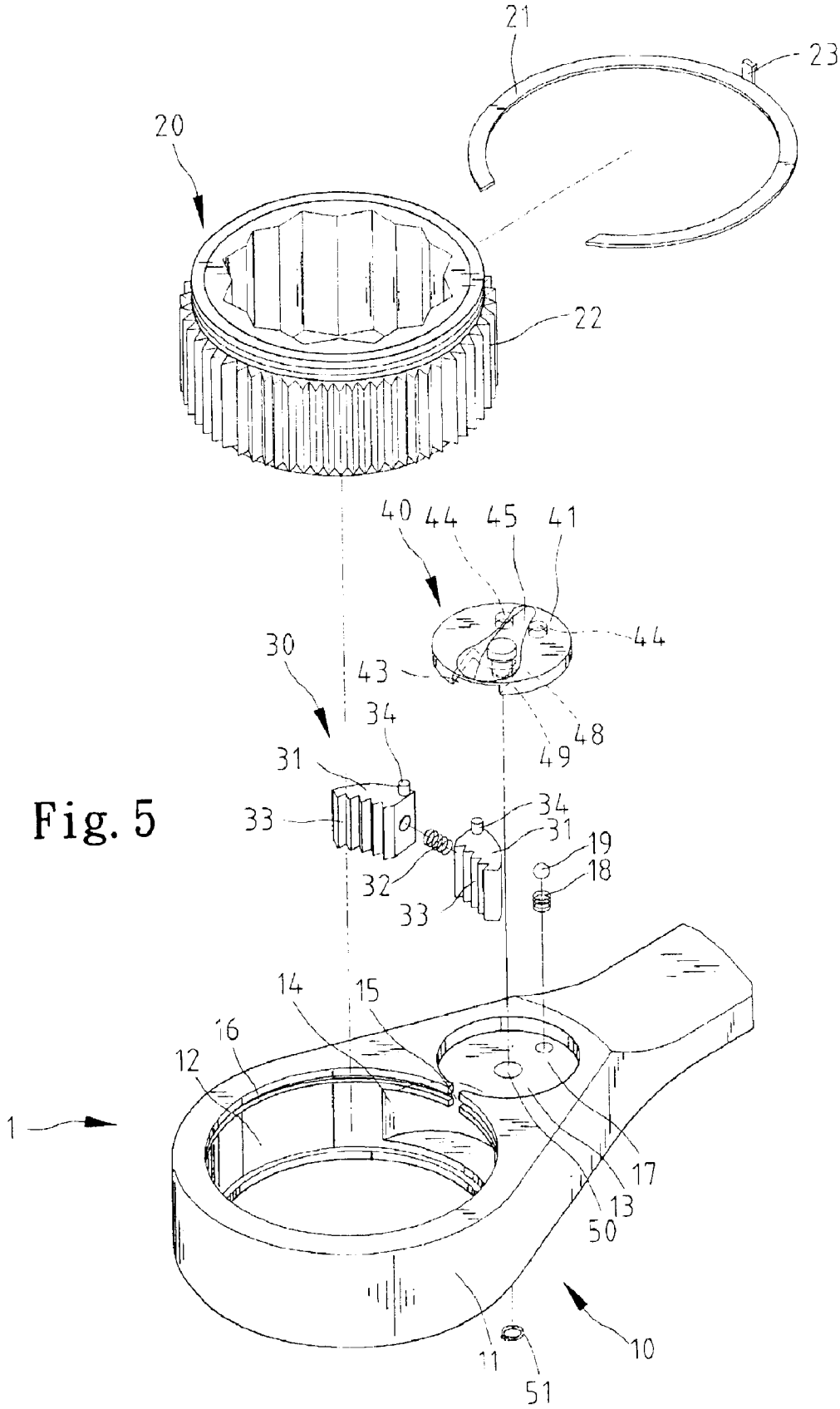
FIG. 5 is an exploded view of a wrench according to a second embodiment of the present invention.

FIG. 5 shows a wrench 1 according to a second embodiment of the present invention. In the second embodiment, the disc 41 includes a rod 48 projecting from the lower face. An annular groove 49 is defined in the rod 48. The rod 48 is inserted through an aperture 50 defined in the bottom of the pothole 13. A C-clip 51 includes an internal edge put in the annular groove 49 and an external edge for abutment against the annular head 11. The second embodiment is otherwise identical to the first embodiment.

Figure 6:
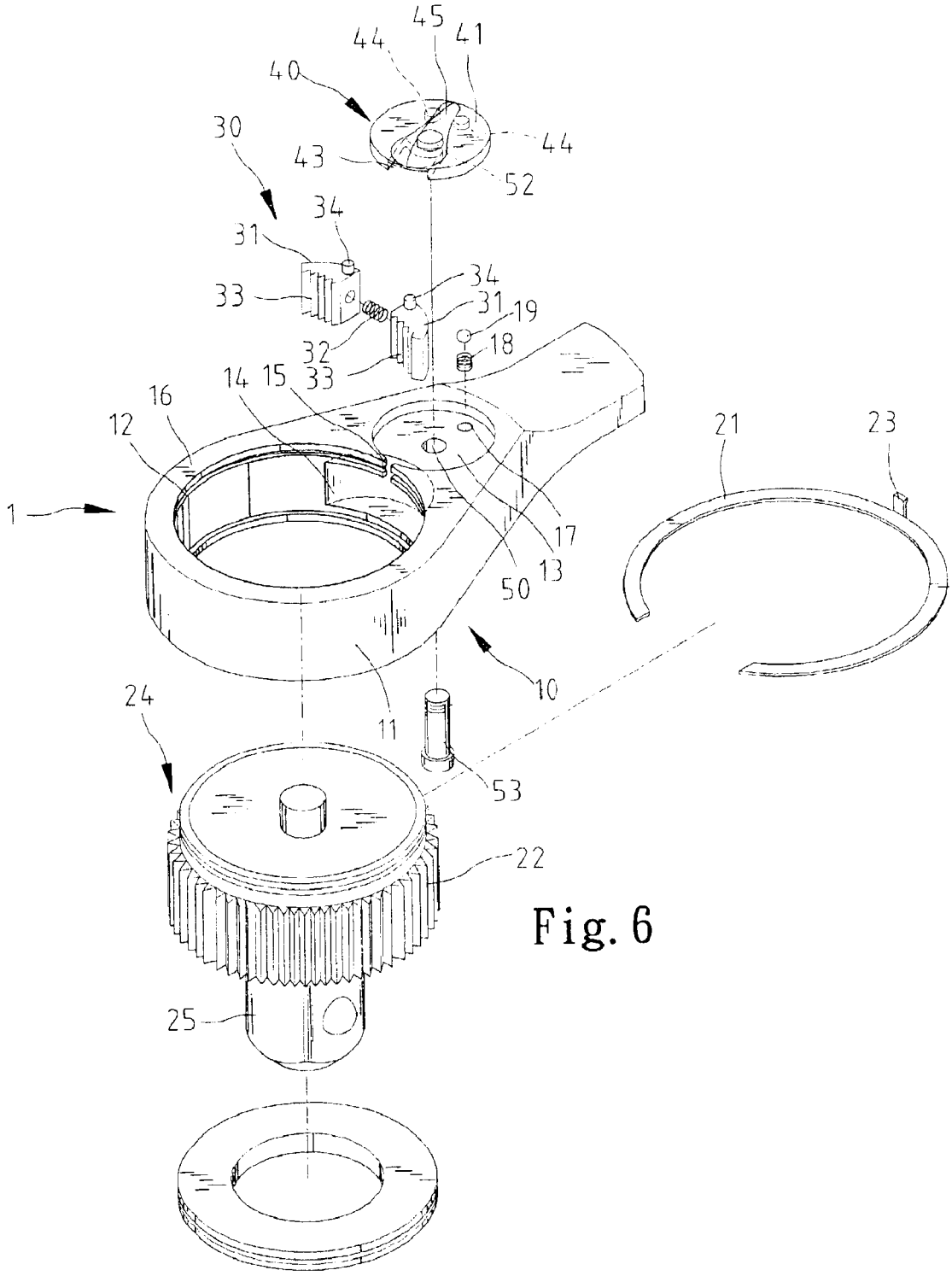
FIG. 6 is an exploded view of a wrench according to a third embodiment of the present invention.

FIG. 6 shows a wrench 1 according to a third embodiment of the present invention. In the third embodiment, the disc 41 includes a hole 52 defined in the lower face. A bolt 53 is driven into the hole 52 through the aperture 50. A gear 24 is put in the space 12. The gear 24 includes an insert 25 projecting from a lower face. The insert 25 can be fit in a socket (not shown) that can receive a nut or a head of a bolt.

An annular groove 49 is defined in the rod 48. The rod 48 is inserted through an aperture 50 defined in the bottom of the pothole 13. A C-clip 51 includes an internal edge put in the annular groove 49 and an external edge for abutment against the annular head 11. The third embodiment is otherwise identical to the second embodiment.

The present invention has been described via detailed illustration of embodiments. Those skilled in the art can derive variations from the embodiments without departing from the scope of the present invention. Therefore, the embodiments shall not limit the scope of the present invention defined in the claims.

What is claimed is:

1. A wrench including:

a handle including an annular head defining a circular space, a pothole not overlapping the circular space, a channel formed in the annular head for communicating the circular space with the pothole, a recess and an annular groove both defined in a wall of the circular space with the circular space and the pot hole disposed meeting at a line of intersection;

a clutch including two claws disposed in the recess and a spring disposed between the claws, the claws each including a toothed face and a rod, wherein the claws can easily by inserted into the recess since the rods can be moved through the channel:

a controller rationally disposed in the pothole for moving the rods;

a gear disposed in the circular space, the gear including a toothed face engagement with the toothed face of one of the claws; and a C-ring including an external edge disposed in the annular groove, an internal edge for retaining the annular gear in the circular space [and a gate projecting from an upper face for blocking the channel].

2. The wrench according to claim 1 wherein the gear is an annular gear including a toothed internal face.

3. The wrench according to claim 1 wherein the gear includes an insert projecting from a lower face.

4. The wrench according to claim 1 including a detent disposed in a hole defined in a bottom of the pothole, and the controller defines two recesses for receiving the detent.

5. The wrench according to claim 1 wherein the controller includes a disc disposed rotationally in the pothole.

6. The wrench according to claim 5 wherein the disc defines a recess for receiving the rods.

7. The wrench according to claim 5 wherein the controller includes a ridge formed on the disc.

8. The wrench according to claim 5 wherein the controller includes a C-ring with an internal edge disposed in an annular groove defined in the disc and an external edge disposed in an annular groove defined in a wall of the pothole.

9. The wrench according to claim 5 wherein the controller includes a rod projecting from the disc and through an aperture defined in the annular head, an annular groove defined in the rod, and a C-Clip including an internal edge disposed in the annular groove and an external edge for abutment against the annular head.

10. The wrench according to claim 5 wherein the controller includes a hole defined in the disc and a bolt driven into the hole through an aperture defined in the annular head.

*11. The wrench according to claim 1 wherein the C-ring includes a gate projecting from an upper face for blocking the channel.*

* * * * *